United States Patent
Fisher

(10) Patent No.: US 6,275,019 B1
(45) Date of Patent: Aug. 14, 2001

(54) ABSOLUTE CONTROL OF NON OVERLAP TIME IN SWITCH MODE POWER CONTROLLER OUTPUT STAGES

(75) Inventor: Justin R. Fisher, Warwick, RI (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 0 days.

(21) Appl. No.: 09/711,386

(22) Filed: Nov. 14, 2000

(51) Int. Cl.$^7$ .................................................. G05F 1/40
(52) U.S. Cl. ............................................. 323/288; 323/283
(58) Field of Search ................................ 323/288, 284, 323/285, 283

(56) References Cited

U.S. PATENT DOCUMENTS

| | | |
|---|---|---|
| 5,260,861 | 11/1993 | Wert . |
| 5,272,615 | 12/1993 | Wert . |
| 5,777,461 | 7/1998 | Massie et al. . |
| 5,781,058 | 7/1998 | Sanzo et al. . |
| 5,896,058 | 4/1999 | Sanzo et al. . |
| 6,057,675 | * 5/2000 | Tateishi ................................ 323/283 |

* cited by examiner

*Primary Examiner*—Shawn Riley
(74) *Attorney, Agent, or Firm*—Robert D. Atkins; Michael T. Wallace

(57) ABSTRACT

A non-overlap circuit is provided for a controller of a switching power supply. The controller includes a clock input coupled to a clocking signal, an enable input, a first drive output, and a second drive output. A current source senses the drive outputs, and in response, provides a current source output that switches on and off. A timing capacitor, coupled to the current source, charges when the current source is on. A switch discharges the timing capacitor when the current source is off. A voltage comparator compares the charge level on the timing capacitor to a reference voltage, and outputs a trigger signal to the enable input of the controller when the charge level on the timing capacitor exceeds the reference voltage. When one drive output switches logic state in response to the clocking signal, the current source charges the timing capacitor until the trigger signal causes the other drive output to switch logic state.

22 Claims, 2 Drawing Sheets

ABSOLUTE CONTROL OF NON OVERLAP TIME IN SWITCH MODE POWER CONTROLLER OUTPUT STAGES

FIELD OF THE INVENTION

The invention relates to switching power supplies, and more particularly, to a circuit for controlling non-overlap times in the controller of such power supplies.

BACKGROUND OF THE INVENTION

Switching power supplies use a driver controller that turns the power switches ON and OFF. It is important that the controller not allow both power switches to be ON at the same time. So, the controller operates to turn OFF one switch before it turns ON the other, a so-called non-overlap condition. For efficient operation of the power supply, the optimum non-overlap duration that both switches are OFF depends on the specific circuit arrangement and the specific components used.

Some controllers use a constant duration non-overlap time that is sufficient for most applications. But this approach means that there will be specific circuit arrangements for which the non-overlap time duration will not be near optimal. Other controllers attempt to control the non-overlap time duration according to the specific circuit arrangement, but such approaches tend to rely on relatively complex sensing and control circuits such as complex phase-locked loops.

BRIEF DESCRIPTION OF THE DRAWINGS

The present invention will be more readily understood by reference to the following detailed description taken with the accompanying drawings, in which.

DETAILED DESCRIPTION OF THE DRAWINGS

Embodiments of the present invention present a non-overlap time control circuit that enables precise control of the non-overlap time, independent of process and temperature.

Figure 1:
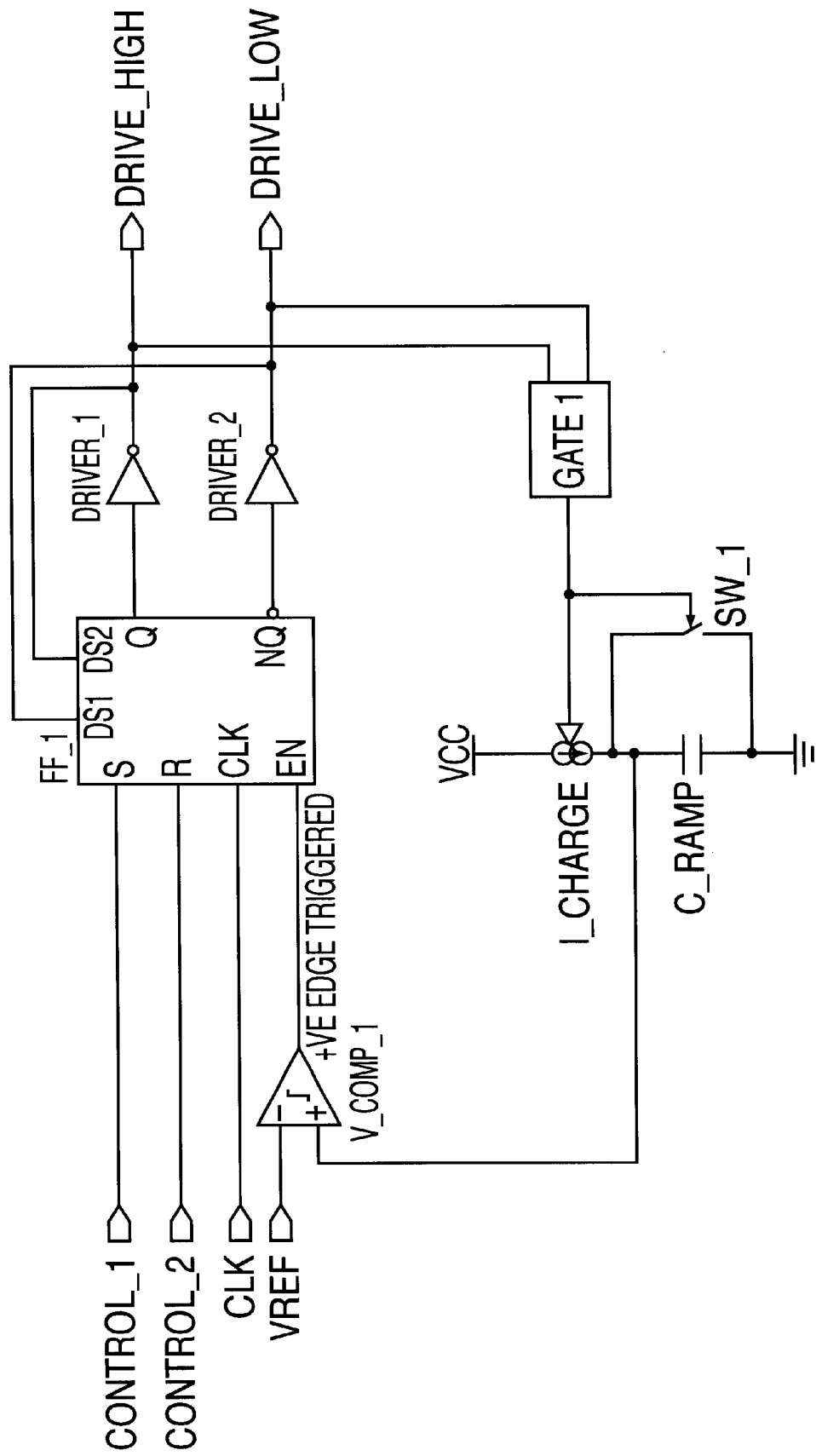
FIG. 1 illustrates a complementary driver controller having a non-overlap circuit according to a representative embodiment.

FIG. 1 shows the structure of a typical embodiment. An SR flip-flop FF_1 is connected to load driving inverters DRIVER_1 and DRIVER_2. The flip-flop contains trivial logic that enables a delay between when the two outputs-non-inverted Q and inverted NQ-switch logic states. This delay is controlled by positive edge triggered input EN. Flip-flop data sensing inputs DS1 and DS2 sense which of the driver outputs is high, and together with the enable pin EN determine which output is delayed, Q or NQ.

A logic gate GATE 1 is connected to the driver outputs, and switches on and off a current source I_CHARGE, which has no first order variation with temperature. In one specific embodiment, I_CHARGE is formed by adding the output of a PTAT (proportional to absolute temperature) current source with a CTAT (complementary to absolute temperature) current source. When the current source I_CHARGE is off, timing capacitor C_RAMP is shorted to ground by switch SW_1. SW_1 may be a semiconductor switch such as an NMOS transistor. The logic gate GATE 1 may be any specific logic circuit, depending on the type of switching circuit-push-pull or totem pole-and desired output-whether switch SW_1 requires a logic 1 or logic 0 to turn on.

A clock pulse at flip-flop input CLK causes the non-delayed flip-flop output to change logic level. This in turn switches on the current source I_CHARGE and removes the short circuit caused by SW_1, causing timing capacitor C_RAMP to charge up. Typically timing capacitor C_RAMP may have a temperature coefficient. This may be compensated for by the current source I_CHARGE. When C_RAMP reaches a given voltage determined by the VREF input to voltage comparator V_COMP_1, the comparator output switches from low to high. This triggers the flip-flop enable input EN, and enables the delayed output of the flip-flop to switch in the desired sequence. This grounds the timing capacitor C_RAMP and the comparator output returns to a low state.

Figure 2:
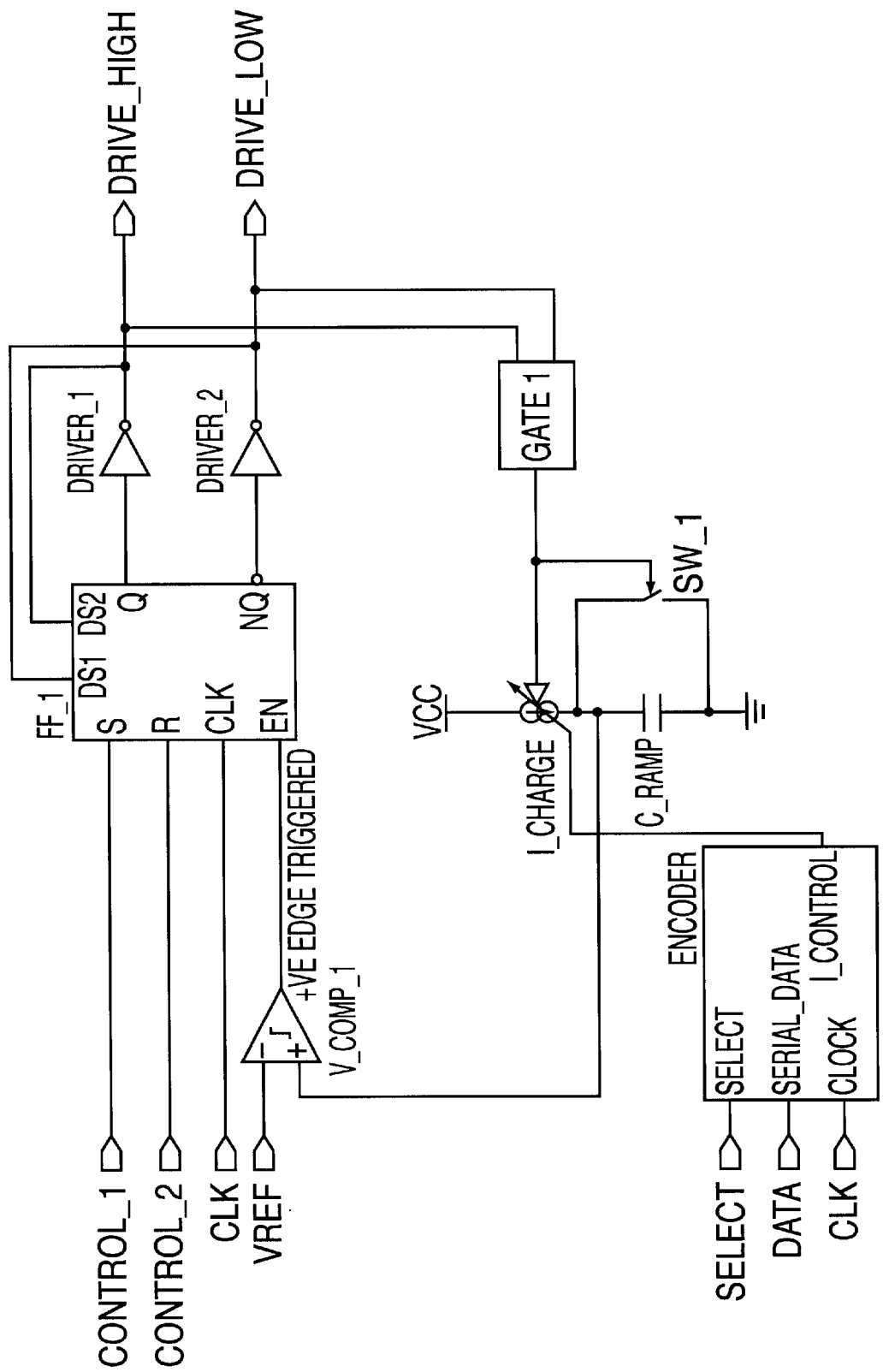
FIG. 2 illustrates a further embodiment employing an EPROM encoder to control the magnitude of the current source.

FIG. 1 shows the logic required for driving a complementary driver. The same technique can be used to drive an N-Type totem pole driver with the addition of an inverter from DRIVE_HIGH to the NOR gate. In this arrangement, DRIVER_2 would be driven from the Q output of a separate flip-flop. A further embodiment of this design is realized in FIG. 2. In this embodiment, an EPROM encoder controls the magnitude of temperature stable current source I_CHARGE. Thus, the desired non-overlap time can be adjusted for any given customer or application. It could also be adjusted by the customer using $E^2$ technology as described in U.S. Pat. No. 5,770,940, incorporated herein by reference.

Although various exemplary embodiments of the invention have been disclosed, it should be apparent to those skilled in the art that various changes and modifications can be made which will achieve some of the advantages of the invention without departing from the true scope of the invention.

What is claimed is:

1. A non-overlap circuit for a controller of a switching power supply, the controller including a clock input coupled to a clocking signal, an enable input, a first drive output, and a second drive output, the non-overlap circuit comprising:

a current source that senses the drive outputs, and in response, provides a current source output that switches on and off;

a timing capacitor, coupled to the current source, that charges when the current source is on;

a switch that discharges the timing capacitor when the current source is off; and a voltage comparator that compares the charge level on the timing capacitor to a reference voltage, and that outputs a trigger signal to the enable input of the controller when the charge level on the timing capacitor exceeds the reference voltage;

wherein when one drive output switches logic state in response to the clocking signal, the current source charges the timing capacitor until the trigger signal causes the other drive output to switch logic state.

2. A non-overlap circuit according to claim 1, wherein the controller includes a flip-flop having the clock input and the enable input, a non-inverting Q output coupled to the first drive output, and an inverting Q-not output coupled to the second drive output.

3. A non-overlap circuit according to claim 2, wherein the controller includes two inverter drivers, one coupled to each flip-flop output, the inverter drivers providing the drive outputs.

4. A non-overlap circuit according to claim 2, wherein the flip-flop includes at least one data sensing input that senses the logic states of the drive outputs, and that determines which drive output is delayed to switch logic states in response to the trigger signal.

5. A non-overlap circuit according to claim 2, wherein the flip-flop includes at least one control signal input that switches between logic states, the control signal being clocked into the flip-flop by the clocking signal.

6. A non-overlap circuit according to claim 1, wherein the switch is a switching transistor.

7. A non-overlap circuit according to claim 1, wherein the current source is temperature independent.

8. A non-overlap circuit according to claim 7, wherein the current source combines the output of a proportional to absolute temperature (PTAT) current source and the output of a complementary to absolute temperature (CTAT) current source.

9. A non-overlap circuit according to claim 1, further comprising:
   a current source magnitude controller that determines the amount of current supplied by the current source.

10. A non-overlap circuit according to claim 9, wherein the current source magnitude controller is an EPROM encoder.

11. A non-overlap circuit according to claim 1, further comprising:
   a logic gate that senses the drive outputs, and in response, provides to the current source a logic gate output that switches between logic states.

12. A switching power supply comprising:
   first and second power switches that, in response to switch drive signals, switch on and off to generate at least one regulated output voltage; and
   a power switch control module including:
      a controller having a clock input coupled to a clocking signal, an enable input, and first and second drive outputs providing the switch drive signals;
      a current source that senses the drive outputs, and in response, provides a current source output that switches on and off;
      a timing capacitor, coupled to the current source, that charges when the current source is on;
      a switch that discharges the timing capacitor when the current source is off; and
      a voltage comparator that compares the charge level on the timing capacitor to a reference voltage, and that outputs a trigger signal to the enable input of the controller when the charge level on the timing capacitor exceeds the reference voltage;
   wherein when one drive output switches logic state in response to the clocking signal, turning off its associated power switch, the current source charges the timing capacitor until the trigger signal causes the other drive output to switch logic state, turning on its associated power switch.

13. A switching power supply according to claim 12, wherein the controller includes a flip-flop having the clock input and the enable input, a non-inverting Q output coupled to the first drive output, and an inverting Q-not output coupled to the second drive output.

14. A switching power supply according to claim 13, wherein the flip-flop includes at least one data sensing input that senses the logic states of the drive outputs, and that determines which drive output is delayed to switch logic states in response to the trigger signal.

15. A switching power supply according to claim 13, wherein the flip-flop includes at least one control signal input that switches between logic states, the control signal being clocked into the flip-flop by the clocking signal.

16. A switching power supply according to claim 12, wherein the switch is a switching transistor.

17. A switching power supply according to claim 12, further comprising:
   a current source magnitude controller that determines the amount of current supplied by the current source.

18. A switching power supply according to claim 17, wherein the current source magnitude controller is an EPROM encoder.

19. A switching power supply according to claim 12, further comprising:
   a logic gate that sense the drive outputs, and in response, provides to the current source a logic gate output that switches between logic states.

20. A method of controlling switch drive signals in a switching power supply having first and second power switches that, in response to the switch drive signals, switch on and off to generate at least one regulated output voltage, the method comprising:
   providing a controller having a clock input coupled to a clocking signal, an enable input, and first and second drive outputs that provide the switch drive signals;
   in response to the clocking signal, switching the logic state of the drive output of a power switch that is on, to turn off the power switch that is on;
   charging a timing capacitor;
   comparing the charge level on the timing capacitor to a reference voltage, and outputting a trigger signal to the enable input of the controller when the charge level on the timing capacitor exceeds the reference voltage;
   in response to the trigger signal, switching the logic state of the other drive output to turn on its associated power switch; and
   discharging the timing capacitor.

21. A method according to claim 20, wherein charging the timing capacitor includes switching on a current source that provides current to the charging capacitor, and discharging the timing capacitor includes switching off the current source.

22. A method according to claim 21, further comprising:
   setting, with a current source magnitude controller, the amount of current supplied by the current source.

* * * * *